United States Patent [19]
Chang

[11] Patent Number: 5,659,207
[45] Date of Patent: Aug. 19, 1997

[54] UNINTERRUPTED POWER SUPPLY WITH A CONTROLLED OPERATION OF ALTERNATELY CHARGING AND DISCHARGING OF INDUCTANCES

[75] Inventor: Yu-Ming Chang, Taipei, Taiwan

[73] Assignee: Delta Electronics, Inc., Taipei, Taiwan

[21] Appl. No.: 518,022

[22] Filed: Aug. 22, 1995

[51] Int. Cl.$^6$ .................. H02J 7/00; H02J 9/00; H02J 1/10; H02J 3/38
[52] U.S. Cl. .................. 307/64; 307/44; 307/66
[58] Field of Search .................. 307/44, 45, 46, 307/47, 48, 64, 66, 86, 87

[56] References Cited

U.S. PATENT DOCUMENTS

| | | | |
|---|---|---|---|
| 4,238,690 | 12/1980 | Clarke | 307/44 |
| 4,728,808 | 3/1988 | Bet-Esh et al. | 307/66 |
| 4,763,013 | 8/1988 | Gvoth, Jr. et al. | 307/66 |
| 5,010,469 | 4/1991 | Bobry | 363/37 |

*Primary Examiner*—Peter S. Wong
*Assistant Examiner*—Bao Q. Vu
*Attorney, Agent, or Firm*—Oblon, Spivak, McClelland, Maier & Neustadt, P.C.

[57] ABSTRACT

The present invention is related to an uninterrupted power supply providing a power for a load. The present uninterrupted power supply includes a rectifying device receiving and rectifying an input power signal for generating first rectified signal; first and a second charge/discharge devices electrically connected to the rectifying device, and alternately executing a charge/discharge operation in response to the first rectified signal; first and second voltage supply devices respectively electrically connected to the first and the second charge/discharge devices, respectively receiving charges from the first and the second charge/discharge devices for being kept at a stable electrical potential level, and outputting a voltage signal for providing the power for the load; and a power reservoir receiving and storing therein the input power signal and outputting a reserve power signal serving as the input power signal to the rectifying device when there is no subsequent input power signal inputted.

20 Claims, 12 Drawing Sheets

5,659,207

UNINTERRUPTED POWER SUPPLY WITH A CONTROLLED OPERATION OF ALTERNATELY CHARGING AND DISCHARGING OF INDUCTANCES

FIELD OF THE INVENTION

The present invention is related to a power supply, and particularly to an uninterrupted power supply.

BACKGROUND OF THE INVENTION

Please refer to FIG. 1 which is a schematic diagram showing a topologic structure of a conventional uninterrupted power supply. It is obvious that if the load in such a topologic structure is required to remain stable when the input power IP1 is interrupted or unstable, the conventional uninterrupted power supply has to include an AC/DC (alternating current/direct current) converter 1 rectifying the alternating input power signal IP1 to generate a direct current signal IP2, a DC/DC converter 2 converting a direct current signal IP2' into a higher level direct current signal IP3, an inverter 3 convening the direct current signal IP2 or IP3 into an alternating current signal IP4, and a power reservoir 4 providing reserve power for the load 5, which are electrically interconnected as shown in FIG. 1.

Another conventional uninterrupted power supply is shown in FIG. 2. This type of uninterrupted power supply also includes an AC/DC converter 1, a DC/DC converter 2, a DC/AC inverter 3 and a power reservoir 4, which have similar functions as those shown in FIG. 1. However, the AC/DC converter 1 further includes a rectifying circuit 11 and a power factor correction (PFC) circuit 12. The direct output RP1 of the power reservoir 4 is arranged into the PFC circuit 12, and the PFC circuit 12 is controlled by a PFC control circuit 13 which includes a PFC IC. The output signal IP2' of the PFC circuit 12 is transmitted to the DC/DC converter 2 to be converted into a higher level direct current signal. Then, a stable and uninterrupted power signal can be provided for the load 5 through the inverter 3.

In order to further illustrate the typical circuit structures inside the blocks of FIG. 2, a schematic circuit structure showing the converter 1 including the rectifying circuit 11 and the PFC circuit 12, and the DC/DC converter 2 is provided, as shown in FIG. 3. The working principle of the circuit structure is well known to those skilled in the art, and is not to be redundantly described here.

The conventional uninterrupted power supplies are generally categorized to possess the aforementioned topologic structures, and have disadvantages as follows.

1. Owing to the existence of the electrically isolated DC/DC converter 2, the conventional uninterrupted power supplies have adverse size and weight.

2. In conventional power supplies, the input power signal IP1 has to be transmitted through several converters 1, 2 and 3 for multi-stage transformation before it is applied to the load 5, so the overall efficiency is reduced due to the frequent conversion operations.

3. The existence of the DC/DC converter 2 makes the conventional power supplies more complicated in structure so that higher cost and lower reliability are caused.

SUMMARY OF THE INVENTION

An object of the present invention is to provide an uninterrupted power supply which has a smaller size than that of the conventional ones owing to the omission of the DC/DC converter.

Another object of the present invention is to provide an uninterrupted power supply which has higher efficiency and higher stability than that of the conventional ones because the input power signal of the present invention does not have to be multiply transformed through the AC/DC converter, DC/DC converter and DC/AC inverter as the conventional ones.

Another object of the present invention is to provide an uninterrupted power supply which can be manufactured at a lower cost and in a simpler structure than the conventional ones can owing to the omission of the DC/DC converter.

In accordance with the present invention, an uninterrupted power supply providing a power for a load includes a rectifying device receiving and rectifying an input power signal for generating a first rectified signal; first and second charge/discharge devices electrically connected to the rectifying device, and alternately executing a charge/discharge operation in response to the first rectified signal; first and second voltage supply devices respectively electrically connected to the first and the second charge/discharge devices, respectively receiving charges from the first and the second charge/discharge devices for being kept at a stable electrical potential level, and outputting a voltage signal for providing the power for the load; and a power reservoir receiving and storing therein the input power signal and outputting a reserve power signal serving as the input power signal to the rectifying device when there is no subsequent input power signal inputted.

In accordance with another aspect of the present invention, the uninterrupted power supply further includes a first switch installed between the first charge/discharge device and the first voltage supply device for controlling an electric connection state between the first charge/discharge device and the first voltage supply device, a second switch installed between the second charge/discharge device and the second voltage supply device for controlling an electric connection state between the second charge/discharge device and the second voltage supply device, a third switch electrically connected to the rectifying device for controlling an input state of the reserve power signal into the rectifying device, a fourth switch electrically connected to the rectifying device for controlling an input state of the input power signal into the rectifying device, and a control device electrically connected to the first, the second, the third and the fourth switches for controlling ON/OFF states of the four switches by respectively outputting first, second, third and fourth switch control signals to the four switches.

In accordance with another aspect of the present invention, the power reservoir includes a charge accumulator outputting the reserve power signal to the rectifying device in response to the third switch control signal. The power reservoir preferably further includes a reserve power charger connected to the charge accumulator for receiving the input power signal to have the charge accumulator kept at a stable electrical potential level.

In accordance with another aspect of the present invention, the uninterrupted power supply further includes a diode for protecting the third switch, the reserve power charger and the charge accumulator from a damage caused by a reversed flow of the reserve power signal.

In accordance with another aspect of the present invention, the rectifying device includes first and second rectifying diodes electrically interconnected in series and respectively electrically connected to the first and the second charge/discharge devices, each of which allows a half cycle of the input power signal to be transmitted therethrough to generate the first rectified signal to the first and the second charge/discharge devices in turn.

In accordance with another aspect of the present invention, the voltage signal is a direct current signal.

In accordance with another aspect of the present invention, the uninterrupted power supply further includes a direct current/alternating current (DC/AC) inverter electrically connected between the first and the second voltage supply devices and the load for converting the direct current signal into an alternating current signal to be applied to the load.

In accordance with another aspect of the present invention, the control device includes a power-input detecting device generating a power-state signal in response to an existence state of the input power signal, a phase-lock device generating a locked signal in response to the input power signal, and a switch control signal generator electrically connected to the power-input detecting device and the phase-lock device and generating the first and the second switch control signals in response to the power-state signal and the locked signal for controlling the first and the second switches.

In accordance with another aspect of the present invention, the power-state signal in a high state, i.e. the third control signal in a low state, disallows the reserve power signal to be outputted to the first and the second charge/discharge devices when the power-input detecting device detects the existence of the input power signal, and the power-state signal in a low state, i.e. the third control signal in a high state, allows the reserve power signal to be outputted to the first and the second charge/discharge devices when the power-input detecting device detects no existence of the input power signal.

In accordance with another aspect of the present invention, a phase of the locked signal is converted to have the same phase as the input power signal when the power-state signal is in a high state, and maintains at the last phase of the input power signal when the power-state signal is in a low state.

In accordance with another aspect of the present invention, the phase-lock device is a phase-lock loop.

In accordance with another aspect of the present invention, the switch control signal generator includes a full-wave rectifying circuit receiving and rectifying the input power signal to output a second rectified signal, a power factor correction IC electrically connected to the fullwave rectifying circuit and outputting a power factor correction signal in response to the second rectified signal, and a photo-coupling driving signal generator electrically connected to the power factor correction IC and generating the first and the second switch control signals in response to the power factor correction signal. The switch control signal generator preferably further includes a differential amplifier generating a low-level direct current signal in response to a voltage signal outputted by the charge accumulator, a feedback compensation circuit for reducing filtered wave of the voltage signal outputted by the first and the second voltage supply devices, and a current-sensing device enabled by signals generated by the first and second switches.

In accordance with another aspect of the present invention, each of the first and the second switches includes a transistor switch.

In accordance with another aspect of the present invention, each of the first and the second switches further includes a current-sensing circuit which adjusts an intensity of a current flowing through the transistor switch and transmits the adjusted current to a secondary circuit thereof to have a current-sensing signal outputted from the secondary circuit and provided for the power factor correction IC.

In accordance with another aspect of the present invention, the photo-coupling driving signal generator includes at least two sets of photo-coupling drivers.

In accordance with another aspect of the present invention, each of the first and the second voltage supply devices includes a capacitor.

In accordance with another aspect of the present invention, each of the first and the second voltage supply devices further includes a first and a second diode for providing a unidirectional charging operation.

In accordance with another aspect of the present invention, each of the first and the second charge/discharge devices includes an inductor.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
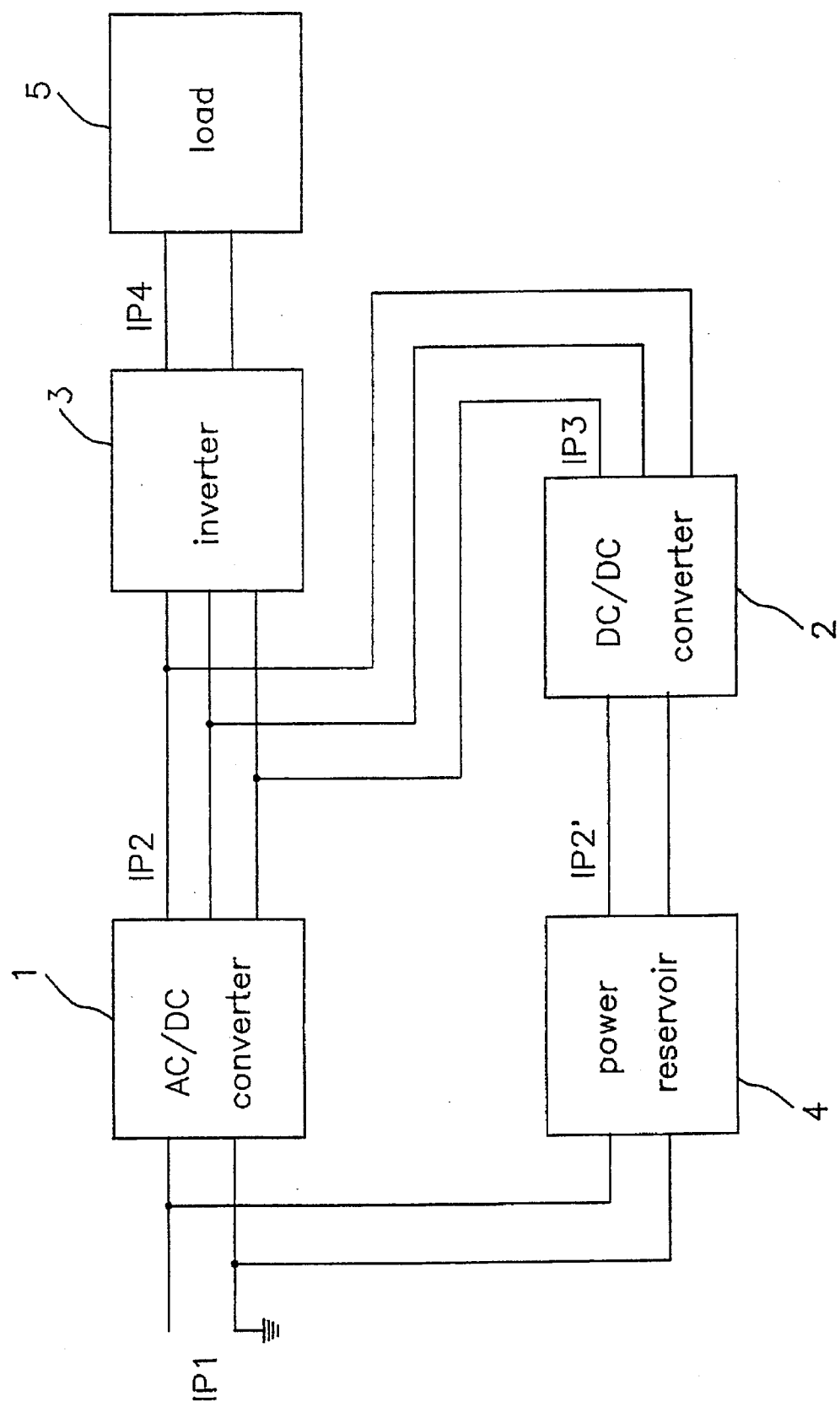
FIG. 1 is a schematic diagram showing a topologic structure of a conventional uninterrupted power supply.
Figure 2:
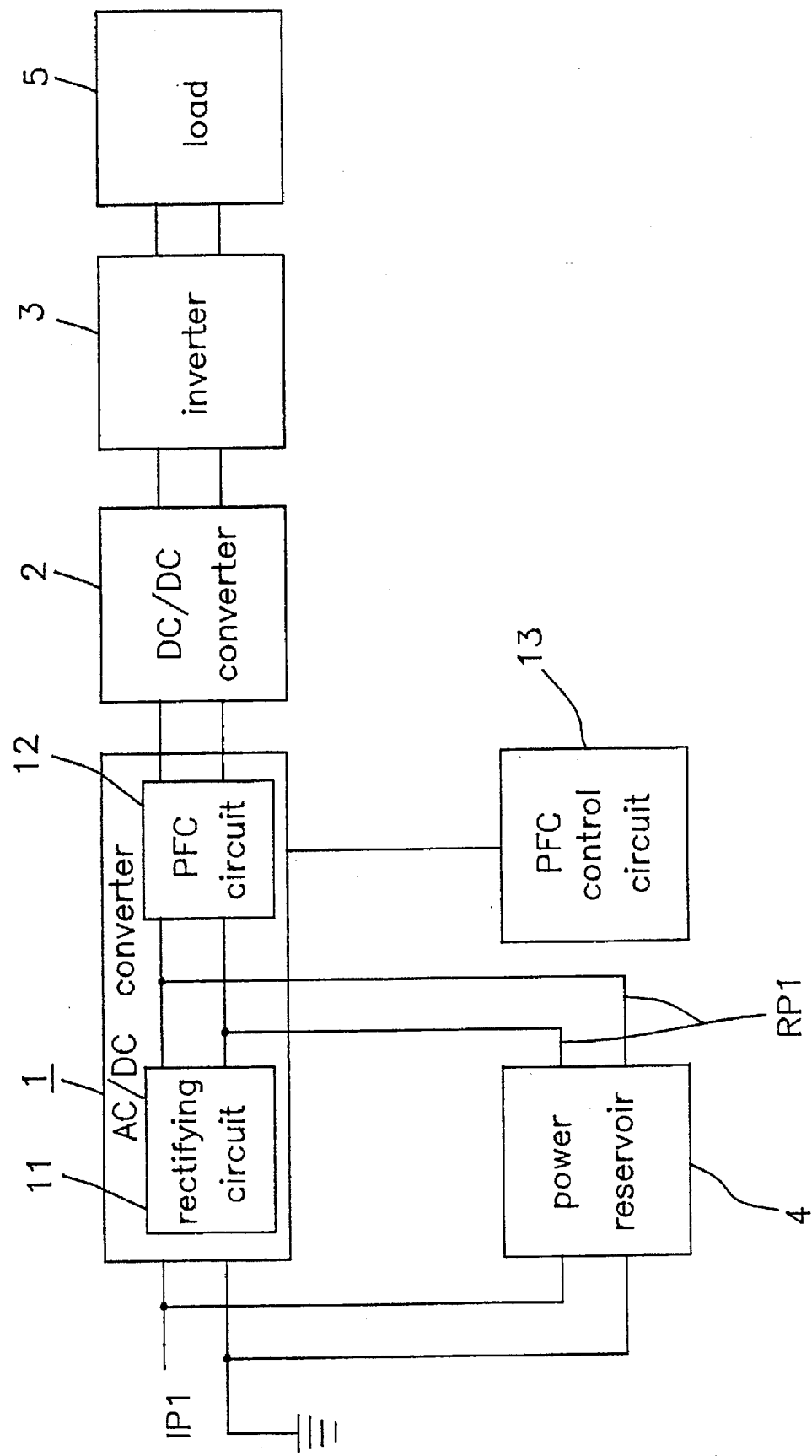
FIG. 2 is a schematic diagram showing a topologic structure of another conventional uninterrupted power supply.
Figure 3:
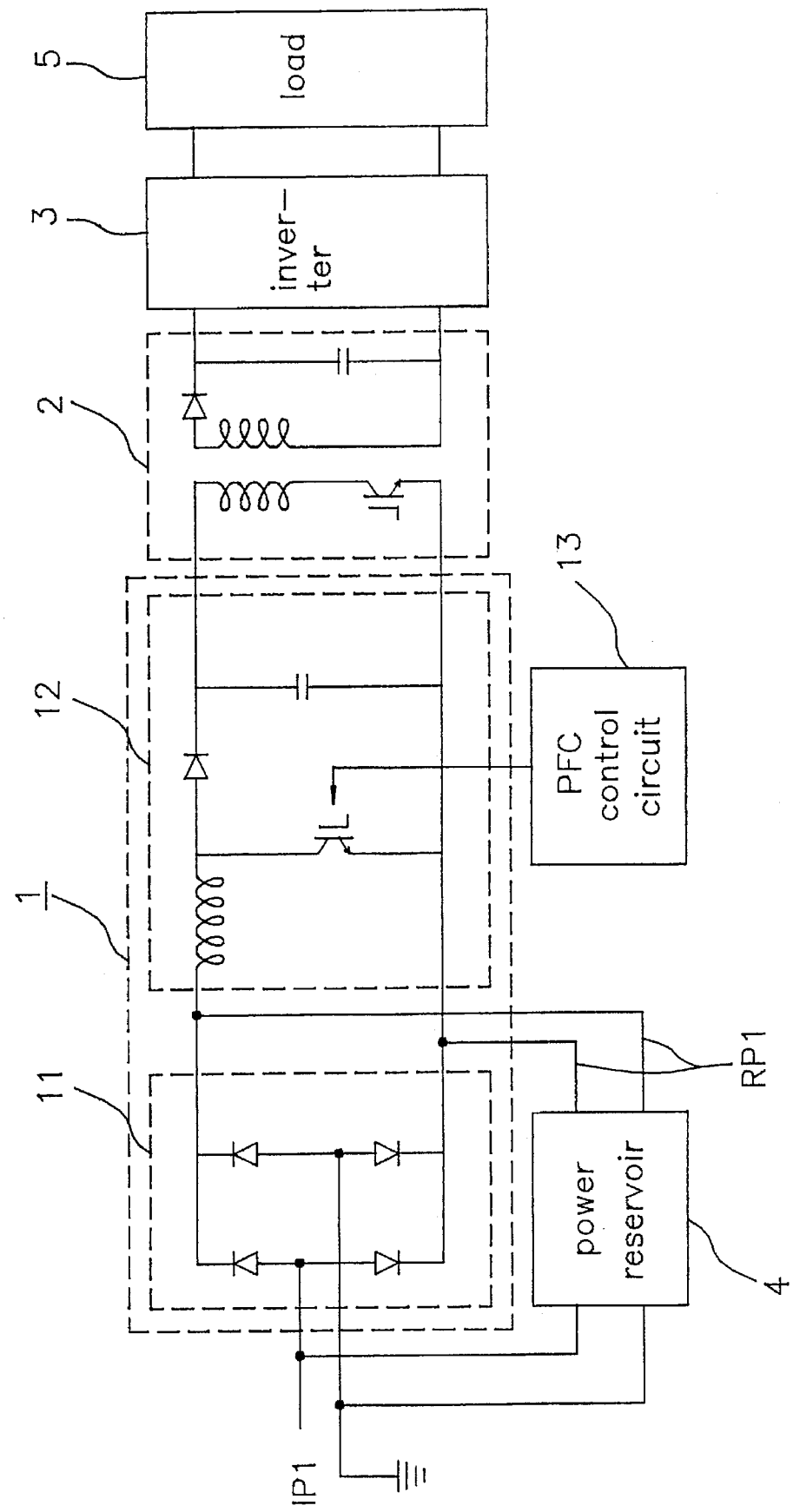
FIG. 3 is a schematic circuit diagram showing a typical circuit structure inside the blocks of FIG. 2.
Figure 4:
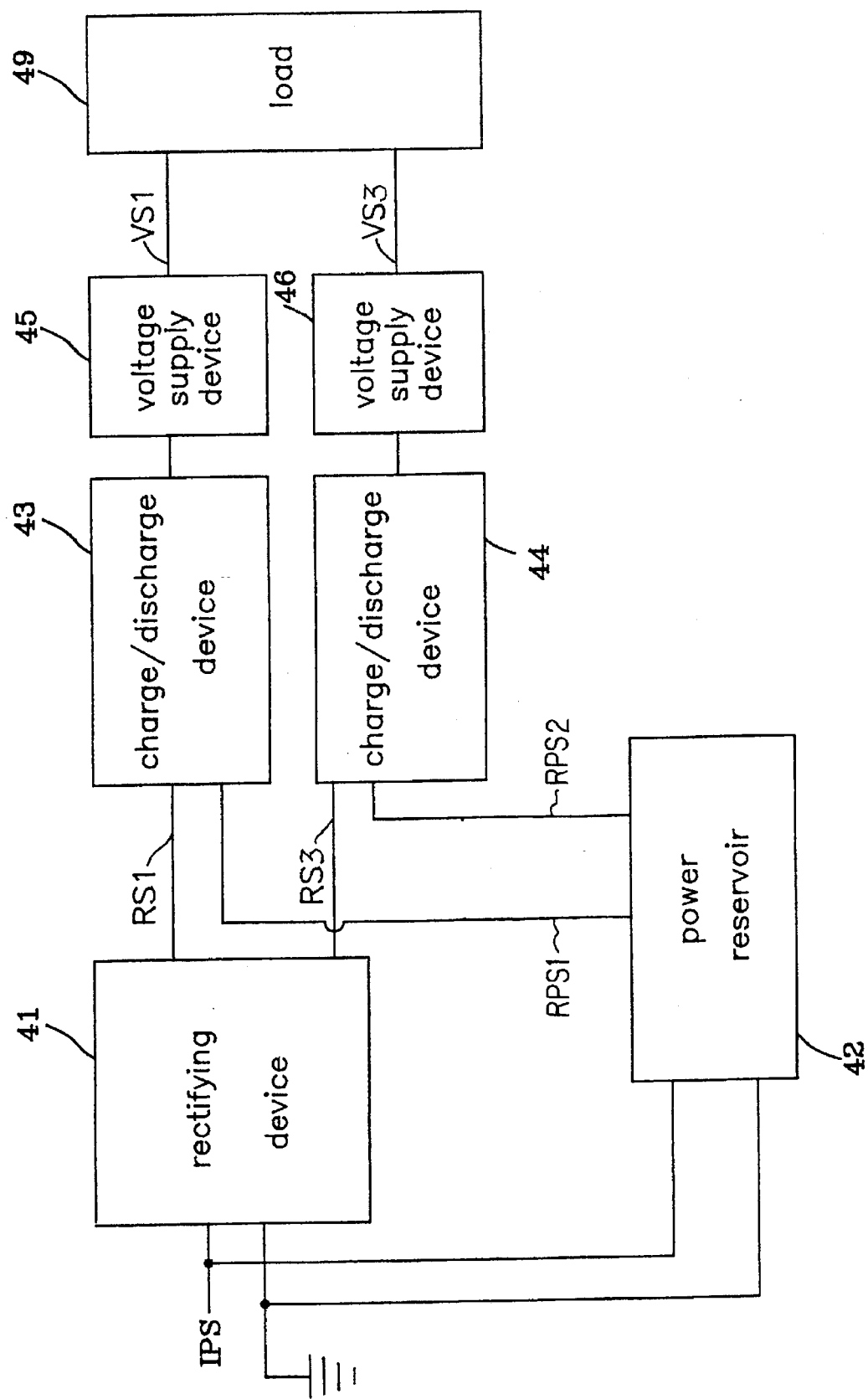
FIG. 4 is a schematic block diagram showing a topologic structure of an uninterrupted power supply according to the present invention.

Please refer to FIG. 4 which is a schematic diagram showing a topologic structure of an uninterrupted power supply according to the present invention. The uninterrupted power supply providing a power for a load 49 includes a rectifying device 41 rectifying an input power signal IPS to generate rectified signals RS1 and RS3, a power reservoir 42 generating reserve power signal RPS serving as the signals RPS1 and RPS2 for supplying for the load 49 when there is no subsequent input power signal IPS inputted, a first and a second charge/discharge devices 43 and 44 electrically connected to the rectifying device 41 and the power reservoir 42 and proceeding a charge/discharge operation in response to the respective rectified signals RS1 and RS3, a first and a second voltage supply devices 45 and 46 respectively electrically connected to the first and the second charge/discharge devices 43 and 44, respectively receiving charges from the first and the second charge/discharge devices 43 and 44 for being kept at a stable electrical potential level and respectively outputting voltage signals VS1 and VS3 for providing the power for the load 49.

Figure 5:
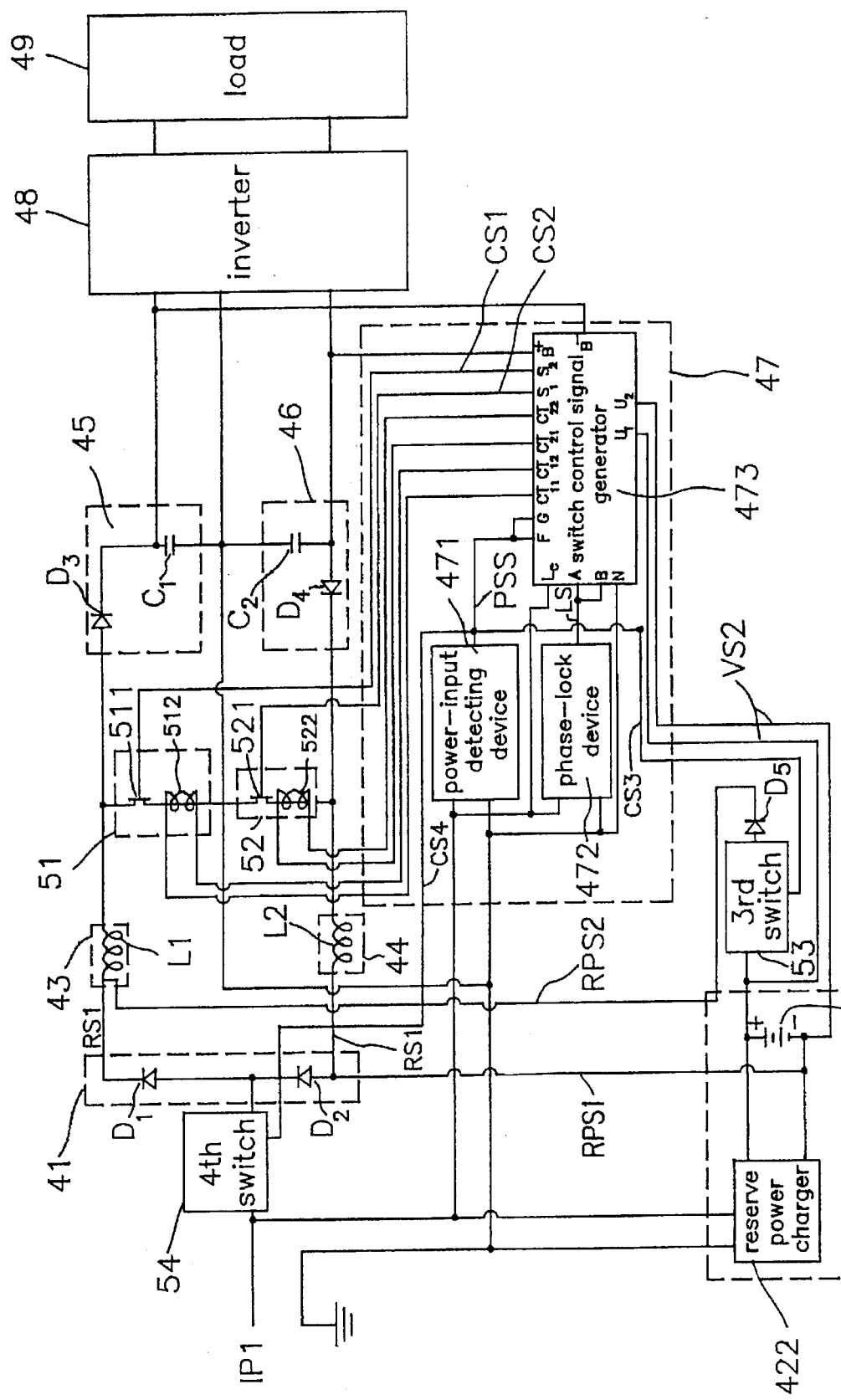
FIG. 5 is a schematic circuit diagram showing a preferred embodiment of an uninterrupted power supply according to the present invention.

A schematic circuit diagram of a preferred embodiment of an uninterrupted power supply according to the present invention is shown in FIG. 5. The same numeral references are used to represent the same devices in both FIGS. 4 and 5. In this preferred embodiment, the rectifying device 41 includes first and second rectifying diodes D1 and D2 electrically interconnected in series and electrically connected to the first and the second charge/discharge devices 43 and 44 for rectifying the input power signal IPS and respectively outputting the rectified signals RS1 and RS3 to the first and the second charge/discharge devices 43 and 44 in turn. The power reservoir 42 includes a charge accumulator 421 receiving and storing therein charges when the input power signal IPS is normally inputted into the rectifying device 41 and outputting the reserve power signals RPS1 and RPS2 to the rectifying device 41 when no subsequent input power signal IPS is detected, and a reserve power charger 422 receiving the input power signal IPS to have the charge accumulator 421 charged. The first and the second charge/discharge devices 43 and 44 respectively include inductors L1 and L2. The first and the second voltage supply devices 45 and 46 respectively include capacitors C1 and C1, and in addition, they include diodes D3 and D4 for providing unidirectional charging operation.

The uninterrupted power supply shown in FIG. 5 further includes a control device 47 electrically connected to the first and the second charge/discharge devices 43 and 44 and the first and the second voltage supply devices 45 and 46 for controlling the charge/discharge operation, and a direct current/alternating current (DC/AC) inverter 48 electrically connected between the first and the second voltage supply devices 45 and 46 and the load 49 for providing an alternating current for the load 49. The uninterrupted power supply further includes a first switch 51 installed between the first charge/discharge device 43 and the first voltage supply device 45 for controlling an electric connection state between the first charge/discharge device 43 and the first voltage supply device 45, a second switch 52 installed between the second charge/discharge device 44 and the second voltage supply device 46 for controlling an electric connection state between the second charge/discharge device 44 and the second voltage supply device 46, a third switch 53 electrically connected to the rectifying device 41 for controlling an input state of the reserve power signals RPS1 and RSP2 into the rectifying device 41, a fourth switch 54 electrically connected to the rectifying device 41 for controlling an input state of the input power signal IPS into the rectifying device 41. The first and the second switches 51 and 52 respectively include transistor switches 511 and 521, and also include current-sensing circuits 512 and 522 which respectively adjust an intensity of the current following through the transistor switches 511 and 521. The uninterrupted power supply further includes a diode D5 for protecting the third switch 53, the reserve power charger 422 and the charge accumulator 421 from a damage caused by a reversed flow of the reserve power signals RPS1 and RSP2. The control device 47 is electrically connected to the first, the second, the third and the fourth switches 51, 52, 53 and 54 for controlling ON/OFF states of the four switches by respectively outputting a first, second, third and fourth switch control signals CS1, CS2, CS3 and CS4 to the four switches.

The control device 47 includes a power-input detecting device 471 generating a power-state signal PSS in response to an existence state of the input power signal IPS, a phase-lock device 472 generating a locked signal LS in response to the input power signal IPS, and a switch control signal generator 473 electrically connected to the power-input detecting device 471 and the phase-lock device 472 and generating the first and the second switch control signals CS1 and CS2 in response to the power-state signal PSS and the locked signal LS for controlling the first and the second switches 51 and 52. The power-state signal PSS in a high state, i.e. the third control signal CS3 in a low state, disallows the reserve power signals RPS1 and RPS2 to be outputted to the first and the second charge/discharge devices 43 and 44 when the power-input detecting device 471 detects the existence of the input power signal IPS, and the power-state signal PSS in a low state, i.e. the third control signal in a high state, allows the reserve power signals RPS1 and RSP2 to be outputted to the first and the second charge/discharge devices 43 and 44 when the power-input detecting device 471 does not detect the existence of the input power signal IPS. The phase of the locked signal LS is converted to have the same phase as the input power signal IPS when the power-state signal PSS is in a high state, and maintains at the last phase of the input power signal IPS when the power-state signal PSS is in a low state. In this case, the phase-lock device 472 is a phase-lock loop. The switch control signal generator 473 will be illustrated with reference to FIG. 6.

Figure 6:
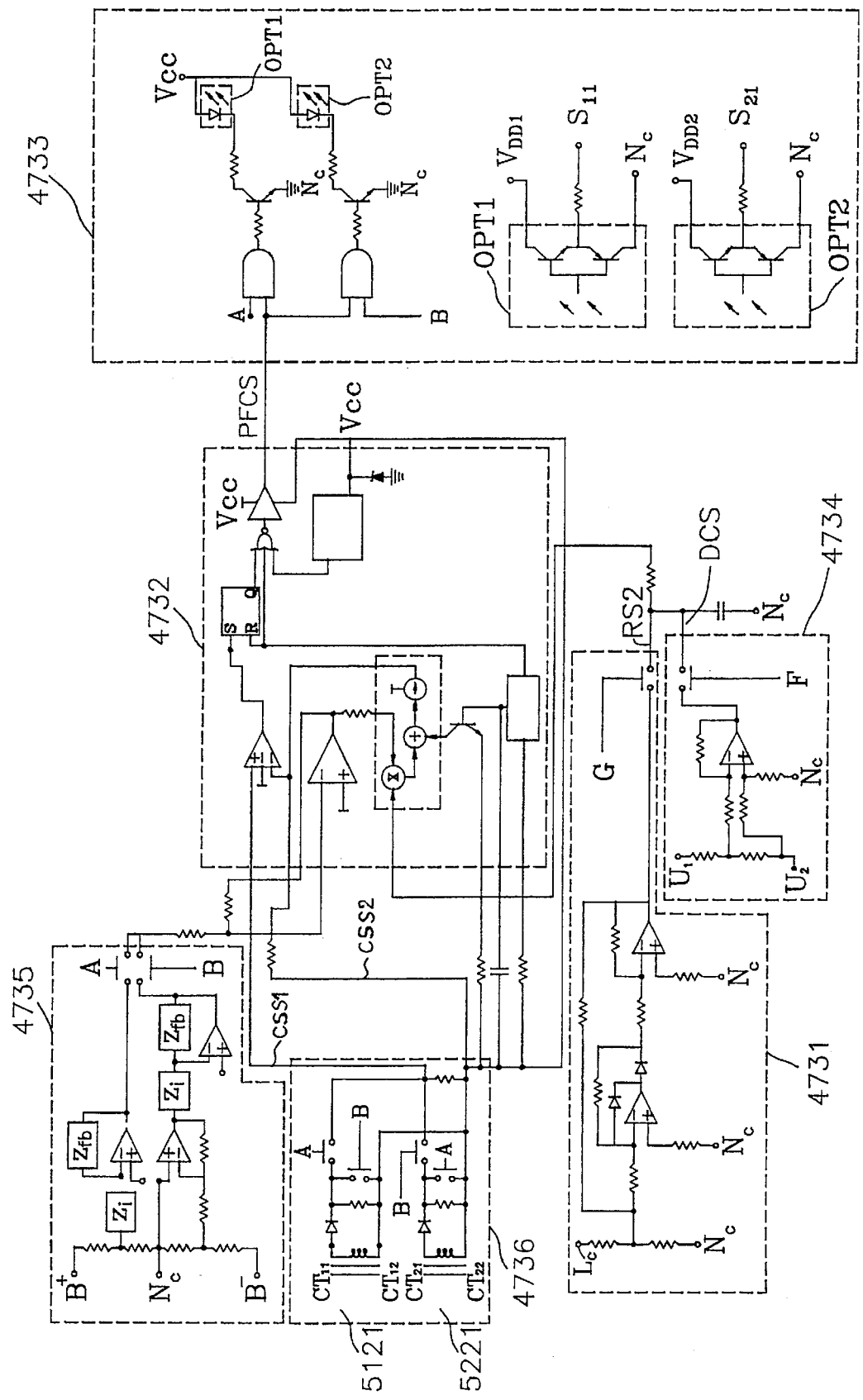
FIG. 6 is a schematic circuit diagram showing a preferred embodiment of a switch control signal generator according to the present invention.

Please refer to FIG. 6 which is a schematic circuit diagram showing a preferred embodiment of a switch control signal generator according to the present invention, the switch control signal generator 473 includes a full-wave rectifying circuit 4731 receiving and rectifying the input power signal IPS to output a second rectified signal RS2, a power factor correction IC 4732 electrically connected to the full-wave rectifying circuit 4731 and outputting a power factor correction signal PFCS in response to the second rectified signal RS2, a photo-coupling driving signal generator 4733 electrically connected to the power factor correction IC 4732 and generating the first and the second switch control signals CS1 and CS2 in response to the power factor correction signal PFCS, a differential amplifier 4734 generating a low-level direct current signal DCS in response to a voltage signal VS2 outputted by the charge accumulator 421, a feedback compensation circuit 4735 for reducing filtered wave of the voltage signals VS1 and VS3 respectively outputted by the first and the second voltage supply devices 45 and 46, and a current-sensing device 4736 enabled by signals CS1 and CS2 generated by the first and second switches 51 and 52. The current adjusted by the current-sensing circuits 512 and 522 of the switches 51 and 52 is transmitted to secondary circuits 5121 and 5221 thereof to have current-sensing signals CSS1 and CSS2 outputted from the secondary circuits 5121 and 5221 and provided for the power factor correction IC 4732. In this preferred embodiment, the photo-coupling driving signal generator 4733 includes at least two sets of photo-coupling drivers OPT1 and OPT2.

The switch control signal generator 473 has input terminals S1 and S2 respectively for the first and the second switch control signals CS1 and CS2, input terminals G and F respectively for power-state signal PSS and inverted power-state signal, an input terminal Lc for the input power signal IPS, a grounded terminal Nc for the input power signal IPS, input terminals A and B respectively for the locked signal LS and inverted locked signal, input terminals U1 and U2 for the voltage signal VS2, input terminals B$^+$ and B$^-$ for the voltage signals VS1 and VS3, and input terminals CT11, CT12, CT21 and CT22 for the current-sensing signals CSS1 and CSS2.

The detailed signal transmission among the full-wave rectifying circuit 4731, the power factor correction IC 4732, the photo-coupling driving signal generator 4733, the differential amplifier 4734, the feedback compensation circuit 4735 and the current-sensing device 4736 are well known to those skilled in the art, so it is not to be redundantly described here.

The working principles of the aforementioned devices are described hereinafter with reference to FIG. 5.

In the case that there are continuous input power signals IPS inputted to the present uninterrupted power supply, the input power signals IPS are respectively inputted to the rectifying device 41 and the power reservoir 42. In this case, the input power signal inputted to power reservoir 42 is received by the reserve power charger 422 and stored in the charge accumulator 421 as the reserve power signals RPS1 and RPS2. The reserve power signals RPS1 and RSP2 will be outputted only when the power-input detecting device 471 does not detect the existence of the input power signal IPS. On the other hand, the power-input detecting device 471 detects the existence of the input power signal IPS, i.e. the power-state signal PSS is in a high state, and the switch control signal generator 473 outputs the third and the fourth switch control signals CS3 and CS4 to conduct the fourth switch 54 and turn off the third switch 53, respectively. Meanwhile, in the positive half cycles, the input power signal IPS is transmitted through the first diode D1 and in the negative half cycles, the input signal IPS is transmitted through the second diode D2. The inductors L1 and L2 are respectively charged from the diodes D1 and D2 in turn, and then respectively discharges to the capacitors C1 and C2. In other words, in the positive half cycles, the input power signal IPS flows through the diode D1, the inductor L1 and the capacitor C1, and in the negative half cycles, the input power signal IPS flows through the diode D2, the inductor L2 and the capacitor C2. Between the inductor L1 and the capacitor C1, the first switch 51 is provided for control the transmission of the charges from the inductor L1 to the capacitor C1. When necessary, the switch control signal CS1 is outputted by the switch control signal generator 473 to conduct the first switch 51 so that the charges in the inductor L1 are allowed to be transmitted to the capacitor C1 to keep the capacitor C1 at a stable electrical potential level. The second switch 52 is used for control the transmission of the charges from the inductor L2 to the capacitor C2 in a similar manner. The switch control signals CS1 and CS2 are generated in response to the locked signal LS generated by the phase-lock loop 472 and transmitted to the switch control signal generator 473.

Then, the voltage signals VS1 and VS3 are transmitted through the DC/AC inverter 48 to be converted to an alternating current provided for the load 49 as the power source.

In this situation, the relationship among the converter 41, the inductors L1 and L2, the switches 51 and 52, and the capacitors C1 and C2 are further illustrated with reference to FIGS. 7A~7D, and the related pulse-mode signals showing the relationship among the locked signal LS and the switch control signals CS1 and CS2 are presented in FIGS. 8A and 8B.

Figure 7B:
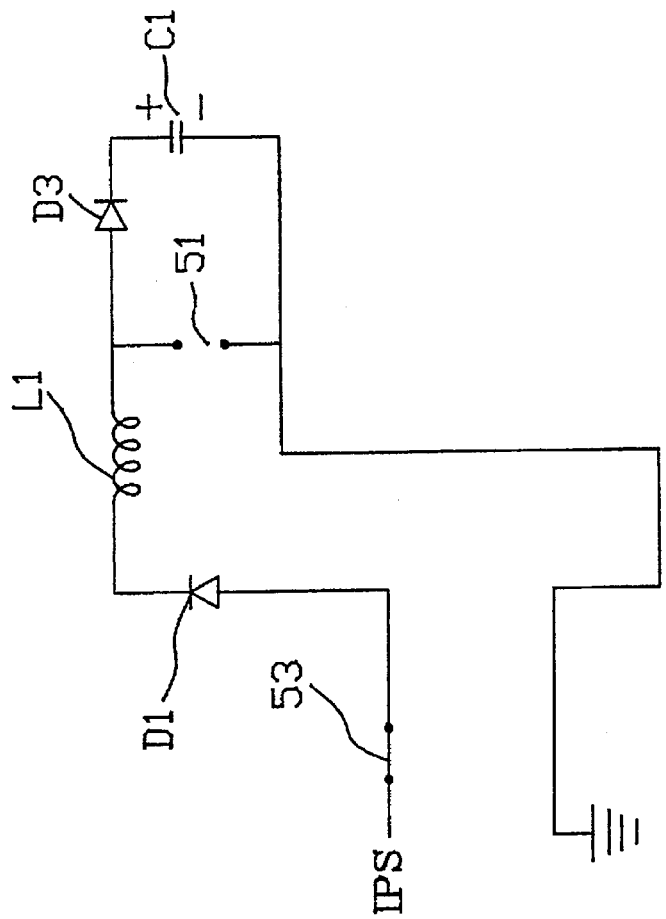
FIGS. 7A~7H are schematic circuit diagrams showing the operations of switches according to the present invention.
Figure 7A:
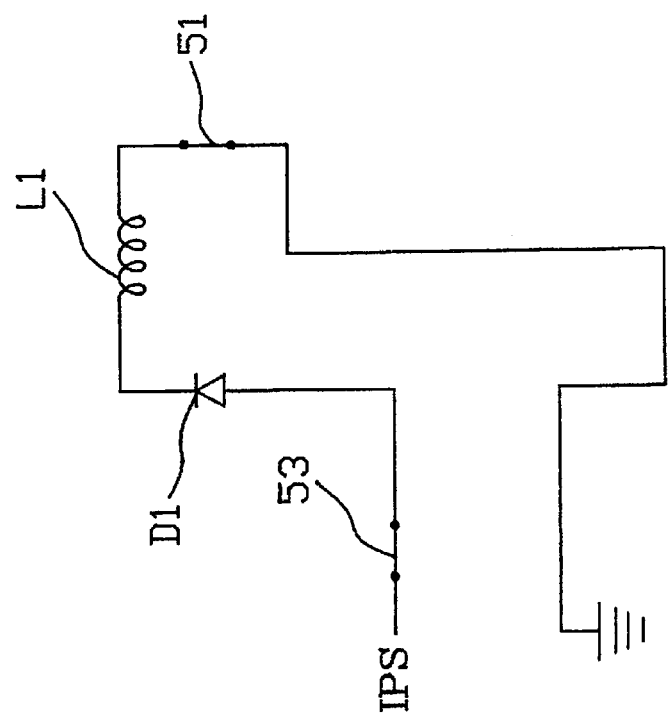
Figure 7D:
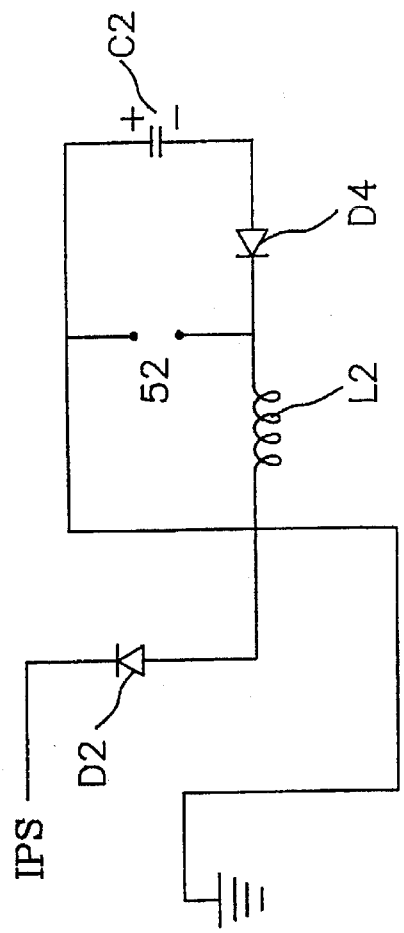
Figure 7C:
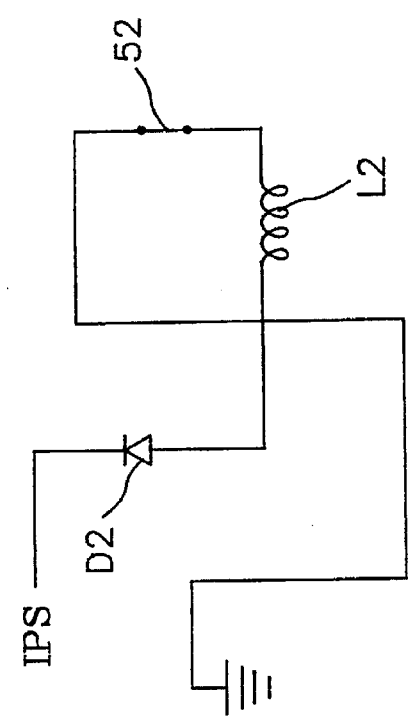
Figure 8B:
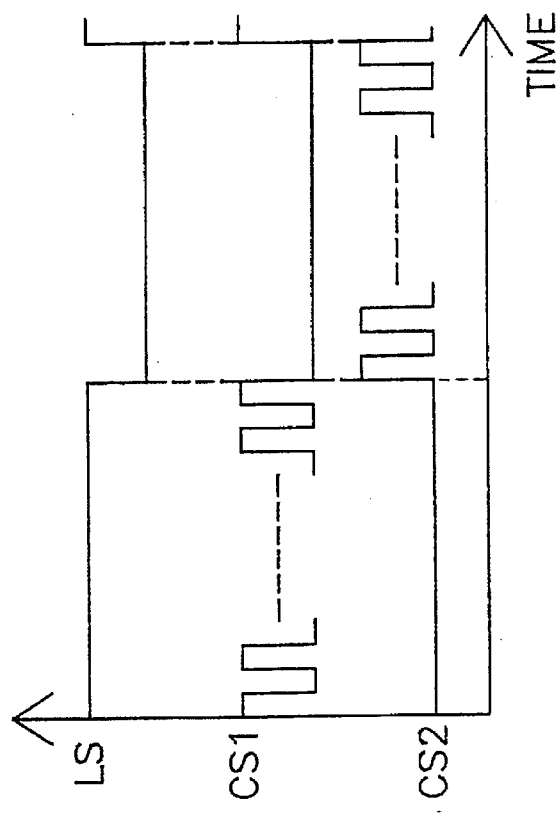
FIGS. 8A~8C are schematic pulse diagrams showing the relationship between a locked signal and the first and the second switch control signals according to the present invention.
Figure 8A:
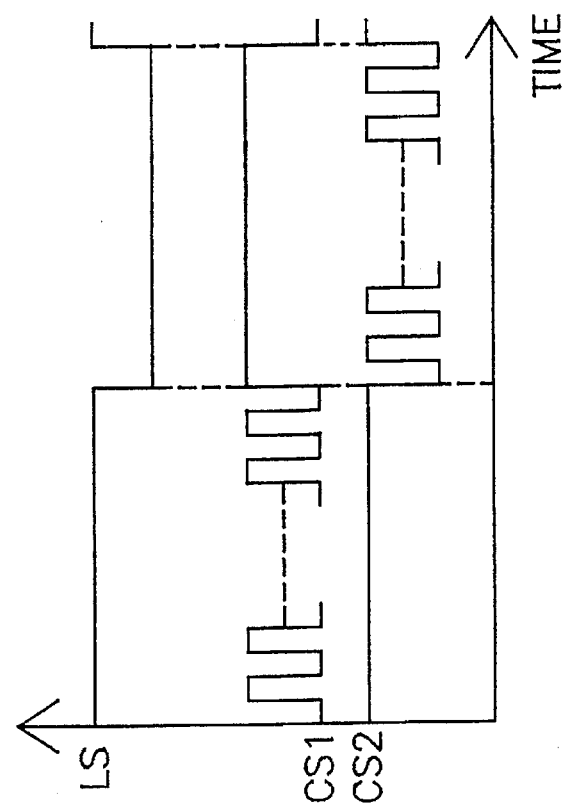

As shown in FIGS. 7A, 7B, 8A and 8B, when the locked signal LS is in a high state, the input power signal IPS is transmitted through the switch 54 and the rectifying diode D1 to the inductor L1 to be stored. Meanwhile, the switch 51 is alternately mined on and mined off by the switch control signal CS1. When the signal CS1 is in a high state, the switch 51 is turned on (FIG. 7A), and the switch 51 is turned off (FIG. 7B) when the signal CS1 is in a low state. When the switch 51 is turned off, the charges in the inductor 431 are discharged to the capacitor 451 (FIG. 7B). As for the switch 52 and the switch control signal CS2, they are not concerned about because the positive input power signal does not pass through the rectifying diode D2 to the switch 52. In other words, the signal CS2 may be high (FIG. 8A) or low (FIG. 8B) during the period of the high-state locked signal LS. As shown in FIGS. 7C, 7D, 8A and 8B, when the locked signal LS is in a low state, the negative input power signal IPS is transmitted through the switch 54 and the rectifying diode D2 to the inductor L2 to be stored. Meanwhile, the switch 52 is alternately turned on and tuned off by the switch control signal CS2. When the signal CS2 is in a high state, the switch 52 is mined on (FIG. 7C), and the switch 52 is turned off (FIG. 7D) when the signal CS1 is in a low state. When the switch 52 is tamed off, the charges in the inductor L2 are discharged to the capacitor C2 (FIG. 7D). As for the switch 51 and the switch control signal CS1, they are not concerned about because the low-state input power signal does not pass through the rectifying diode D1 to the switch 51. In other words, the signal CS1 may be high (FIG. 8A) or low (FIG. 8B) when the locked signal LS is in a low state.

In another case that the power-state signal PSS is in a low state, i.e. there is no subsequent input power signal inputted, the fourth switch 54 is turned off but the third switch 53 is mined on. The locked signal LS for generating the signals CS1 and CS2 maintains at the original phase of the input power signal IPS. Meanwhile, the transistor switches 51 and 52 are alternately turned on and mined off by the first and the second switch control signals CS1 and CS2. The conduction of the fourth switch 54 makes the inductors L1 and L2 able to be charged by the charge accumulator 421 and alternately discharge to the capacitors C1 and C2. The charges in the capacitors C1 and C2 are transmitted to the inverter 48 to be converted into alternating current and then provided for the load 49.

In this situation, the relationship among the charge accumulator 421, the inductors L1 and L2, the switches 51 and 52, and the capacitors C1 and C2 are illustrated with reference to FIGS. 7E~7H, and the related pulse-mode signals showing the relationship among the locked signal LS and the switch control signals CS 1 and CS2 are presented in FIG. 8C.

Figure 7F:
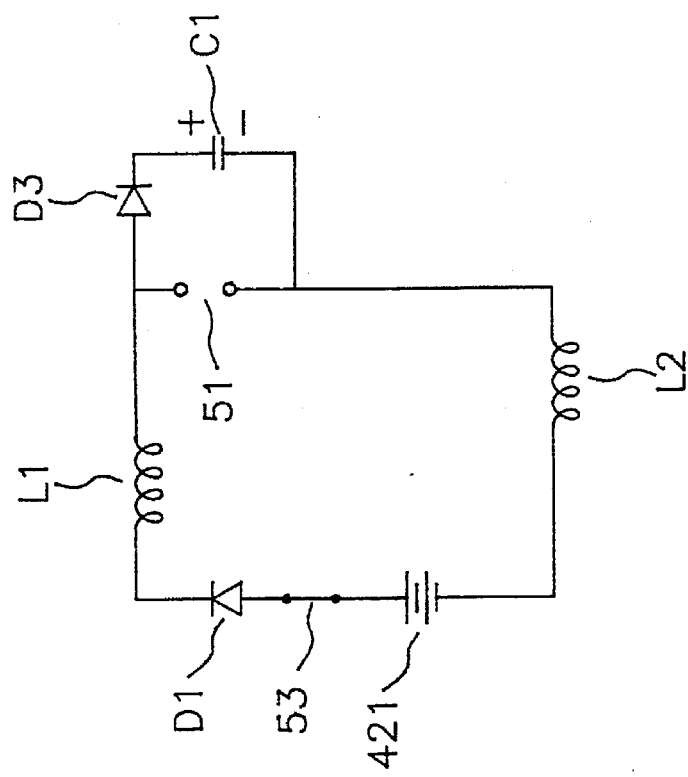
Figure 7E:
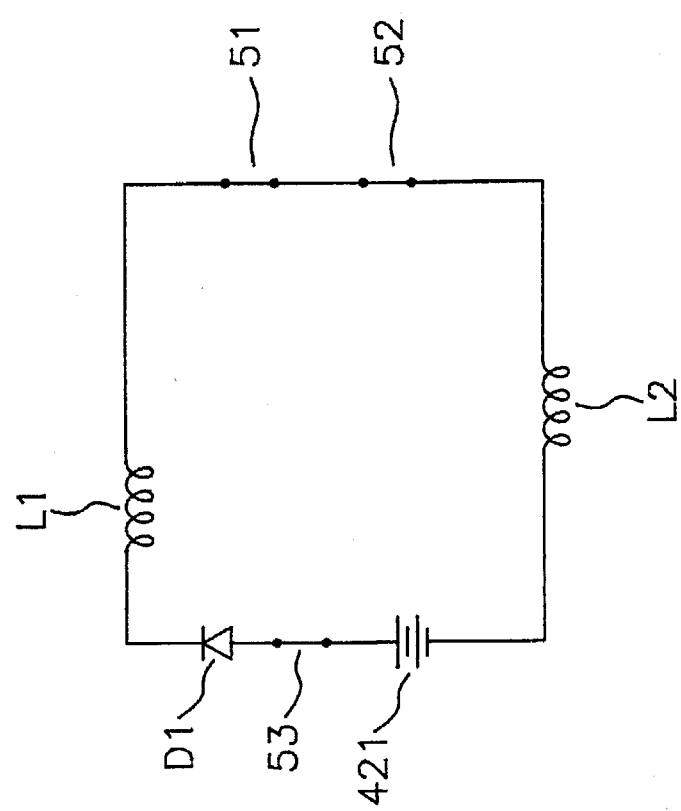
Figure 7H:
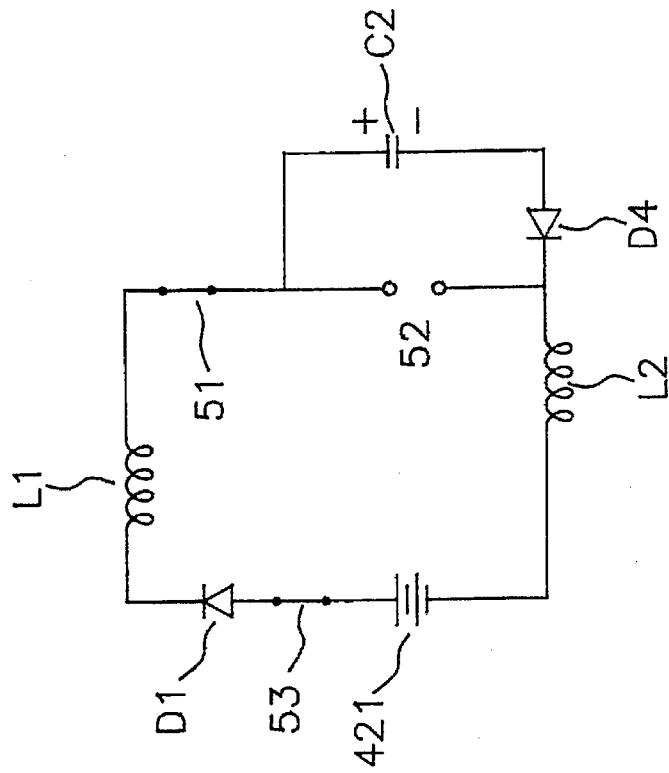
Figure 7G:
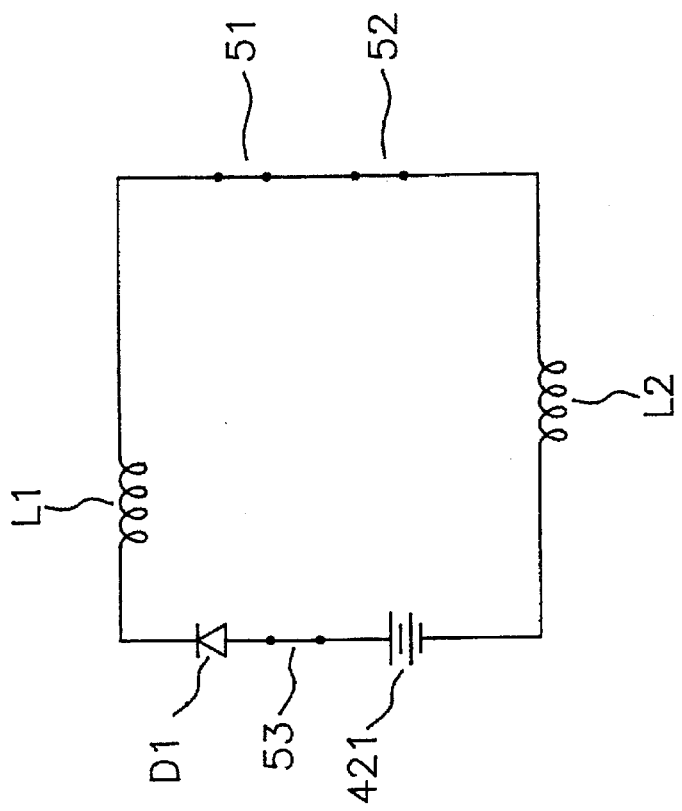
Figure 8C:
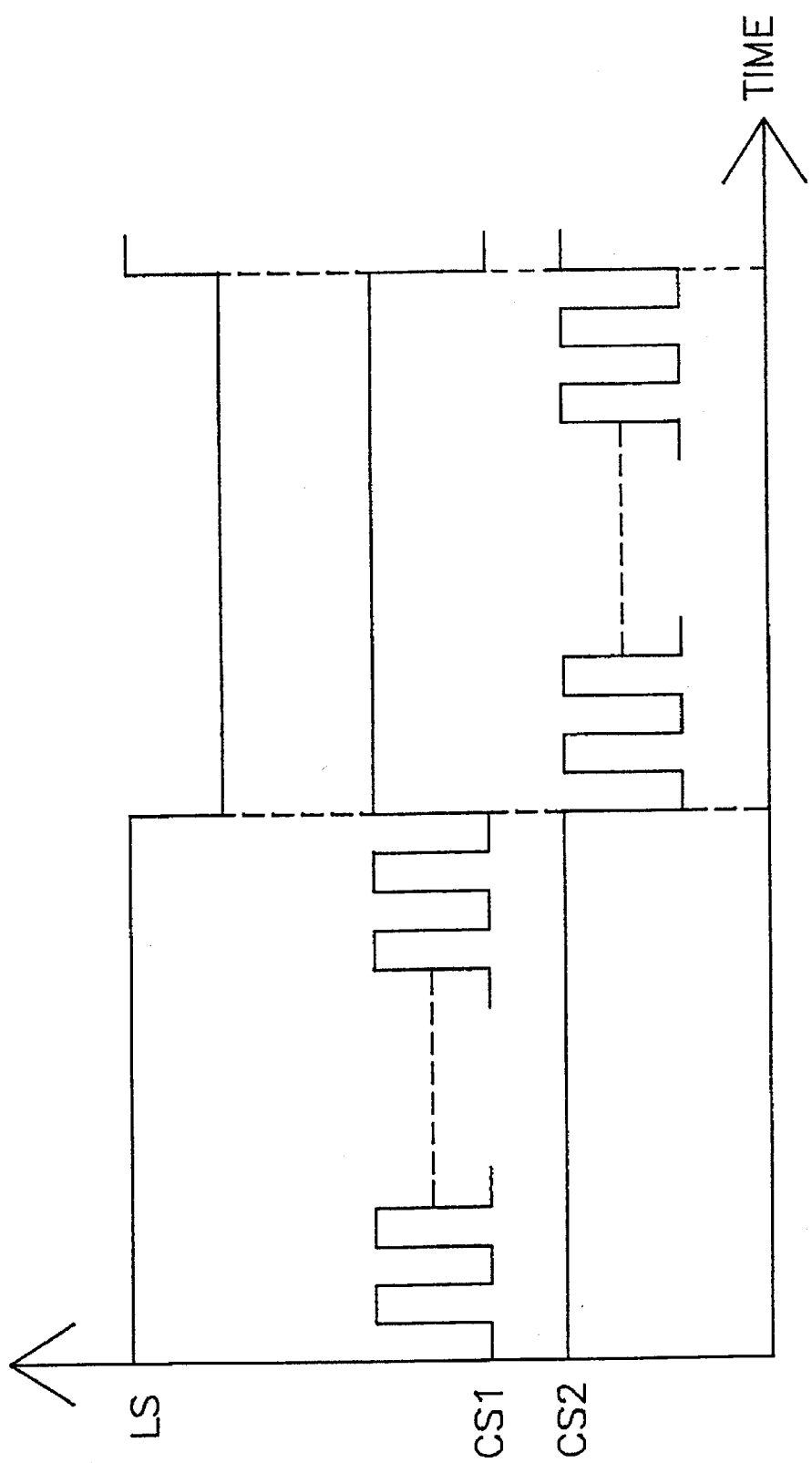

As shown in FIGS. 7E, 7F and 8C. When the locked signal LS is in a high state, the reserve power signals RPS1 and RSP2 are is transmitted through the switches 51, 52 and 53 and the diode D1 to the inductor L1 to be stored. Meanwhile, the switch 51 is alternately mined on and turned off by the switch control signal CS1. When the signal CS1 is in a high state and the switches 51 and 52 are turned on (FIG. 7E), the inductors L1 and L2 are charged from the charge accumulator 421. When the switch 51 is turned off but the switch 52 remains at the on-state, the charges in the inductors L1 and L2 are discharged to the capacitor C1 (FIG. 7F). The relevant pulse-mode signal is shown in the left half portion of FIG. 8C. As shown in FIGS. 7G, 7H and 8C, when the locked signal LS is in a low state, the reserve power signals RPS1 and RSP2 are is transmitted through the switches 51, 52 and 53 and the rectifying diode D2 to the inductor L2 to be stored. Meanwhile, the switch 52 is alternately turned on and tuned off by the switch control signal CS2. When the signal CS2 is in a high state and the switches 51 and 52 are turned on (FIG. 7G), the inductors L1 and L2 are charged from the charge accumulator 421. When the switch 52 is mined off but the switch 51 remains at the on-state, the charges in the inductors L1 and L2 are discharged to the capacitor C2 (FIG. 7H). The relevant pulse-mode signal is shown in the right half portion of FIG. 8C.

The aforementioned devices and elements such as the diodes, inductors, charge accumulator, inverter and the circuits in the switch control signal generator 473, etc, are well known to those skilled in the art so that they are not described in detail in the disclosure.

To sum up, The present invention has advantages of:
1. having a smaller size than that of the conventional ones owing to the omission of the DC/DC converter;
2. having a higher efficiency than the conventional ones because the input power signal of the present invention does not have to be transformed between AC and DC through the rectifying device, converter and inverter as the conventional ones do; and
3. being able to be manufactured at a lower cost than the conventional ones owing to the omission of the DC/DC converter.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An uninterrupted power supply providing a power for a load, comprising:
    a rectifying device receiving and rectifying an input power signal for generating a first rectified signal;
    first and second charge/discharge devices electrically connected to said rectifying device, and alternately executing a charge/discharge operation in response to said first rectified signal;
    first and second voltage supply devices respectively electrically connected to said first and said second charge/discharge devices, respectively receiving charges from said first and said second charge/discharge devices for being kept at a stable electrical potential level, and outputting a voltage signal for providing said power for said load; and
    a power reservoir receiving and storing therein said input power signal and outputting a reserve power signal serving as said input power signal to said rectifying device when there is no subsequent input power signal inputted.

2. An uninterrupted power supply according to claim 1 further comprising:
    a first switch installed between said first charge/discharge device and said first voltage supply device for controlling an electric connection state between said first charge/discharge device and said first voltage supply device;
    a second switch installed between said second charge/discharge device and said second voltage supply device for controlling an electric connection state between said second charge/discharge device and said second voltage supply device;
    a third switch electrically connected to said rectifying device for controlling an input state of said reserve power signal into said rectifying device;
    a fourth switch electrically connected to said rectifying device for controlling an input state of said input power signal into said rectifying device; and
    a control device electrically connected to said first, said second, said third and said fourth switches for controlling ON/OFF states of said four switches by respectively outputting a first, a second, a third and a fourth switch control signals to said four switches.

3. An uninterrupted power supply according to claim 1 wherein said power reservoir includes a charge accumulator outputting said reserve power signal to said rectifying device in response to said third switch control signal.

4. An uninterrupted power supply according to claim 3 wherein said power reservoir further includes a reserve power charger connected to said charge accumulator for receiving said input power signal to have said charge accumulator charged.

5. An uninterrupted power supply according to claim 4 further comprising a diode for protecting said third switch, said reserve power charger and said charge accumulator from a damage caused by a reversed flow of said reserve power signal.

6. An uninterrupted power supply according to claim 1 wherein said rectifying device includes first and second rectifying diodes electrically interconnected in series and respectively electrically connected to said first and said second charge/discharge devices, each of which allows a half cycle of said input power signal to be transmitted therethrough to generate said first rectified signal to said first and said second charge/discharge devices in turn.

7. An uninterrupted power supply according to claim 1 wherein said voltage signal is a direct current signal.

8. An uninterrupted power supply according to claim 7 further comprising a direct current/alternating current (DC/AC) inverter electrically connected between said first and said second voltage supply devices and said load for converting said direct current signal into an alternating current signal to be applied to said load.

9. An uninterrupted power supply according to claim 1 wherein said control device includes:
    a power-input detecting device generating a power-state signal in response to an existence state of said input power signal;
    a phase-lock device generating a locked signal in response to said input power signal; and
    a switch control signal generator electrically connected to said power-input detecting device and said phase-lock device and generating said first and said second switch control signals in response to said power-state signal and said locked signal for controlling said first and said second switches.

10. An uninterrupted power supply according to claim 9 wherein said power-state signal is in a high state and said third control signal is in a low state to disallow said reserve power signal to be outputted to said first and said second charge/discharge devices when said power-input detecting device detects the existence of said input power signal, and said power-state signal is in a low state and said third control signal is in a high state to allow said reserve power signal to be outputted to said first and said second charge/discharge devices when said power-input detecting device detects no existence of said input power signal.

11. An uninterrupted power supply according to claim 10 wherein a phase of said locked signal is converted to have the same phase as said input power signal when said power-state signal is in a high state, and maintains at the last phase of said input power signal when said power-state signal is in a low state.

12. An uninterrupted power supply according to claim 11 wherein said phase-lock device is a phase-lock loop.

13. An uninterrupted power supply according to claim 12 wherein said switch control signal generator includes:

a full-wave rectifying circuit receiving and rectifying said input power signal to output a second rectified signal;

a power factor correction IC electrically connected to said full-wave rectifying circuit and outputting a power factor correction signal in response to said second rectified signal; and a photo-coupling driving signal generator electrically connected to said power factor correction IC and generating said first and said second switch control signals in response to said power factor correction signal.

14. An uninterrupted power supply according to claim 13 wherein said switch control signal generator further includes:

a differential amplifier generating a low-level direct current signal in response to a voltage signal outputted by said charge accumulator;

a feedback compensation circuit for reducing filtered wave of said voltage signal outputted by said first and said second voltage supply devices; and a current-sensing device enabled by signals generated by said first and second switches.

15. An uninterrupted power supply according to claim 13 wherein each of said first and said second switches includes a transistor switch.

16. An uninterrupted power supply according to claim 15 wherein each of said first and said second switches further includes a current-sensing circuit which adjusts an intensity of a current flowing through said transistor switch and transmits said adjusted current to a secondary circuit thereof to have a current-sensing signal outputted from said secondary circuit and provided for said power factor correction IC.

17. An uninterrupted power supply according to claim 1 wherein said photo-coupling driving signal generator includes at least two sets of photocoupling drivers.

18. An uninterrupted power supply according to claim 1 wherein each of said first and said second voltage supply devices includes a capacitor.

19. An uninterrupted power supply according to claim 18 wherein each of said first and said second voltage supply devices further includes a first and a second diode for providing a unidirectional charging operation.

20. An uninterrupted power supply according to claim 1 wherein each of said first and said second charge/discharge devices includes an inductor.

* * * * *